: 2,911,285

MANUFACTURE OF SYNTHETIC SODALITE

James W. Earley and Ivan H. Milne, Oakmont, Pa., assignors to Gulf Research & Development Company, Pittsburgh, Pa., a corporation of Delaware No Drawing. Application December 12, 1956
Serial No. 627,733

6 Claims. (Cl. 23—110)

This invention relates to manufacture of synthetic sodalite, and more particularly to a process of manufacturing a synthetic sodalite of crystalline nature from an amorphous silica-alumina gel. The synthetic sodalite product has been found to be useful in the ceramic industry as a glaze, and is also suitable for transformation into other products, including ion exchange materials.

Natural sodalite is a silicate of sodium and aluminum with some chlorine and has the chemical formula

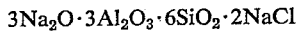

$$3Na_2O \cdot 3Al_2O_3 \cdot 6SiO_2 \cdot 2NaCl$$

It is a transparent and translucent mineral of vitreous or greasy luster and may be white in color, gray, greenish, yellowish, blue or red. Its specific gravity is ordinarily within the range of 2.1 to 2.4. Its hardness on the Moh's scale is 5.5 to 6, and its fusibility is 3.5 to 4 when expressed according to Von Kobell's scale of fusibility. The crystal system is isometric and, when examined by X-ray, the material is found to have normal symmetry, and the lattice is simple cubic but near that of body-centered cubic type. As with all natural minerals, sodalite may vary somewhat in chemical composition, and Winchell's Elements of Optical Mineralogy (John Wiley & Sons, 1931), recognizes a sodalite group comprising sodalite, noselite, hauynite, and lazurite, the noselite, hauynite, and lazurite differing from sodalite in the substitution of $Na_2SO_4$, $2CaSO_4$, and $2Na_2S$, respectively, for the $2NaCl$ in the above-given formula for sodalite. The product of our process appears to be yet another variety of sodalite, differing from the more common $3Na_2O \cdot 3Al_2O_3 \cdot 6SiO_2 \cdot 2NaCl$ in that NaOH is substituted for the NaCl thereof. Nevertheless, as will be subsequently pointed out, there is close correspondence in crystalline structure between natural sodalite and our synthetic product. It is our product, with NaOH substituted for the NaCl of true sodalite, that we refer to herein when we speak of synthetic sodalite.

The raw material on which we operate is amorphous, a fact which makes its conversion to crystalline form in our synthetic sodalite quite remarkable.

The cracking of higher boiling hydrocarbons to produce gasoline is performed today mostly by catalytic cracking processes. The catalysts used in these catalytic cracking processes cover a wide range of materials and one major class of these catalysts is made up of synthetic silica-alumina cracking catalysts which are composite materials and are commonly referred to as calcined composites of undried hydrous silica and alumina gels. Cracking catalysts of this character which may or may not have been used to the point where their catalytic activity has been greatly reduced, constitute the raw materials upon which we operate. These catalysts, as manufactured for the petroleum industry, are silica-alumina catalysts manufactured by forming a silica-alumina hydrogel; that is, by combining precipitated hydrated silica gel and precipitated hydrated alumina gel without drying the gels. These catalysts are some times manufactured by processes which include precipitating one hydrogel in the presence of the other as by co-precipitating the gels, separately precipitating the hydrogels and combining the undried hydrogels, or by first precipitating the silica hydrogel and then forming the silica-alumina hydrogel by precipitating a gel or gelatinous precipitate of alumina in the presence of the silica hydrogel. The combined gels are then dried, pelleted, if pellets are desired, and then usually calcined in air at a temperature of 800° to 1100° F., ordinarily at about 1000° F. These catalysts are usually made from raw materials containing alkali metals, and it is the normal practice to remove such metals from the gels either before or after drying by treatment of the gels with an acid or a material that has base exchange properties such as ammonium hydroxide or ammonium chloride.

These synthetic silica-alumina cracking catalysts are amorphous and substantial variations in the proportions of silica and alumina does not materially affect the properties, indicating that they are not true chemical compounds, yet there appears to be some sort of union resulting from combining the hydrous gels which is not readily possible when silica and alumina are combined by other methods. The more important catalysts ordinarily contain a greater proportion of silica than alumina, a silica content as high as 80 to 95 percent being common.

Some times the silica-alumina catalysts are prepared by precipitating a silica hydrogel, drying this gel, and then combining the resulting dry silica gel with alumina in a form which is generally referred to as a hydrogel but which may be a gelatinous precipitate of aluminum hydroxide. This is some times done by mixing the silica gel with a solution of a soluble aluminum salt such as aluminum nitrate and then precipitating the alumina hydrogel by treating the resulting mixture with an alkaline material, advantageously ammonium hydroxide.

Petroleum cracking catalysts of the character described above are commonly referred to as Houdry-type catalysts and they will be so referred to herein whether or not they have been previously used in the catalytic cracking of petroleum.

X-ray powder diffraction studies have been made on a number of samples of Houdry catalysts and the patterns obtained have been identical, showing only a broad diffraction peak in the neighborhood of 4 Angstrom. It is evident that these materials are amorphous in character and that the diffraction peak at 4 Angstrom represents some average interatomic distance.

A typical analysis of Houdry catalyst is given in Table I.

In manufacturing our synthetic sodalite from Houdry-type catalysts we first extract the Houdry-type catalyst with a weak sodium hydroxide solution, the strength of the sodium hydroxide being of the order of two to seven percent, and the temperature of extraction being elevated in order to shorten the extraction time. A range of from about 100° F. to an upper limit at its boiling point is effective. When conducting this extraction in the neighborhood of 212° F. an extraction time of one hour has proven adequate. When using 5 percent NaOH solution a volume approximately equal to that of the Houdry catalyst has proven adequate. The addition of solid sodium hydroxide to wet catalyst in this step has been found to defeat the process and result in an amorphous final product instead of our crystalline synthetic sodalite. Use of a weak solution gives the necessary differential action to remove more silica than alumina.

After this first extraction or digestion with weak sodium hydroxide, the material is washed with water and then may be centrifuged. However, the washing and centrifuging are not indispensable, any thorough separation of hydroxide and extract being adequate. At this stage the residue is still amorphous but somewhat different from the original material. While our X-ray powder diffraction studies of a number of spent Houdry catalysts showed identical patterns having only a broad diffraction peak at about 4 Angstrom units, the same material, after extraction with weak sodium hydroxide as described above, showed only peaks at about 3.15 and 6.6 Angstrom, with the larger spacing showing a very weak intensity.

Table I, herewith, shows an analysis of typical Houdry catalyst and, for comparison, an analysis of a sample of extracted residue of the identical Houdry catalyst after it had been extracted for one hour with a 5 percent sodium hydroxide solution at 185° F. All figures in both columns are based on one unit weight of Houdry catalyst.

*Table I*

|  | Houdry Catalyst | Extracted Residue |
|---|---|---|
| $SiO_2$ | 0.8606 | 0.1280 |
| $Al_2O_3$ | 0.1058 | 0.0404 |
| $SiO_2$, gram mol | 0.01433 | 0.00213 |
| $Al_2O_3$, gram mol | 0.00104 | 0.000396 |
| Molecular ratio of $SiO_2$ to $Al_2O_3$ | 13.8 | 5.4 |

The residue from the first extraction with sodium hydroxide, after being washed with water, is subjected to a second extraction, advantageously at a temperature in the neighborhood of 200° F. Best results in this second extraction are obtained by the use of solid NaOH with the wet once-extracted material. Use of solid NaOH for this purpose has the advantage of generating considerable heat of solution with the moisture on the wet extracted material and also generating considerable heat of reaction, thereby elevating the temperature of the material being processed. The solid NaOH, together with the residual wash water on the catalyst residue gives a saturated solution of NaOH. A slightly weaker solution of sodium hydroxide will also ordinarily prove effective, particularly solutions having NaOH concentration within 5 percent to 10 percent of saturation, which latter is a 50 percent solution. Much weaker solutions ordinarily give a different product, this being of amorphous character. I find that one part by weight of dry NaOH to four parts of once-extracted catalyst is an effective proportion.

After extracting the catalyst with the concentrated NaOH, advantageously for a minimum period of five minutes, we add water to reduce the concentration to within the approximate range of 2 percent to 7 percent NaOH. After so reducing the strength of the NaOH the material is heated to a temperature of from 100° F. up to the boiling point of the solution for an interval ordinarily within the range of two to ten minutes. It is important at this stage to avoid an over-energetic or exothermic reaction and the temperature is lowered if necessary to avoid this occurrence. The material is then washed with water to remove all traces of sodium hydroxide and the washed residue is our final product.

A comparison of the X-ray powder diffraction patterns of true sodalite and of our final product, which we choose to call "synthetic sodalite" is given in Table II herewith:

*Table II*

| True Sodalite | | Synthetic Sodalite | |
|---|---|---|---|
| Intensity | Lattice Spacing, Angstrom | Intensity | Lattice Spacing, Angstrom |
| 68 | 6.33 | 82 | 6.32 |
| 8 | 4.44 | 9 | 4.44 |
| 5 | 3.92 | 11 | 4.04 |
| 100 | 3.65 | 100 | 3.65 |
| 11 | 2.82 | 11 | 3.15 |
| 26 | 2.56 | 47 | 2.82 |
| 31 | 2.37 | 52 | 2.58 |
| 50 | 2.09 | 7 | 2.38 |
|  |  | 35 | 2.10 |

By way of specific example, one hundred pounds of Houdry-type catalyst of the character shown in the first column of Table I was extracted with an approximately equal volume of five percent hydroxide solution for one hour at a temperature of 185° F. It was then washed with water. Drying and weighing of a small sample of the extracted and washed material indicated that this residual material had a dry weight of approximately eighteen pounds, whereupon four and one half pounds of dry sodium hydroxide was added and stirred into the once-extracted material. The heats of solution and reaction raised the temperature considerably, and outside heat was added to raise the temperature of the mass to 200° F. This temperature was maintained for five minutes and then water was added to reduce the strength of the sodium hydroxide to five percent by weight. This lowered the temperature to approximately 130° F. and the mass was maintained at that temperature for a further interval of five minutes. At the end of that period the entire contents of the kettle were filtered and the separated solid, our synthetic sodalite, was finally washed with water to free it of all caustic and extract. X-ray powder diffraction studies were made on this product and the resulting data are shown in the accompanying Table II, this data being presented there under the heading "Synthetic Sodalite."

What we claim is:

1. In the manufacture of synthetic sodalite, the process which comprises: extracting an amorphous calcined composite of undried hydrous silica and alumina gels with a weak solution of sodium hydroxide and thereby obtaining an extract and a catalyst residue; separating the sodium hydroxide and the said extract from the catalyst residue; subjecting the said catalyst residue from the said extraction to a second extraction, the said second extraction being a two-stage extraction performed first with a substantially saturated solution of sodium hydroxide and then with a sodium hydroxide solution having a strength within the approximate range of 2 percent to 7 percent; separating the extract from the solid residue of the last mentioned extraction and washing the said solid residue with water and so obtaining a crystalline synthetic sodalite.

2. The process of manufacturing a synthetic sodalite which comprises: extracting an amorphous calcined composite of undried hydrous silica and alumina gels with sodium hydroxide solution having a concentration of NaOH within the range of 2 percent to 7 percent and thereby obtaining an extract and a catalyst residue; separating the sodium hydroxide and the said extract from the catalyst residue; subjecting the catalyst residue from the said extraction to a second extraction, the said second extraction being a two-stage extraction performed first at a temperature in the neighborhood of 200° F. with sodium hydroxide having a concentration of at least 40 percent and then with a sodium hydroxide solution having a strength within the approximate range of 2 percent to 7 percent; separating the extract from the solid residue of the last mentioned extraction and washing the said solid residue with water and so obtaining a crystalline synthetic sodalite.

3. The process of manufacturing a synthetic sodalite which comprises: extracting an amorphous calcined composite of undried hydrous silica and alumina gels with sodium hydroxide solution having a concentration of NaOH within the range of 2 percent to 7 percent and continuing the said extraction for a period not substantially less than one hour and thereby obtaining an extract and a catalyst residue; separating the sodium hydroxide and the said extract from the catalyst residue; subjecting the catalyst residue from the said extraction to a second extraction, the said second extraction being a two-stage extraction performed first at a temperature in the neighborhood of 200° F. with sodium hydroxide having a concentration of at least 40 percent and then with a sodium hydroxide solution having a strength within the approximate range of 2 percent to 7 percent; separating the extract from the solid residue of the last mentioned extraction and washing the said solid residue with water and so obtaining a crystalline synthetic sodalite.

4. The process of manufacturing a synthetic sodalite which comprises: extracting an amorphous calcined composite of undried hydrous silica and alumina gels with sodium hydroxide solution having a concentration of NaOH within the range of 2 percent to 7 percent and thereby obtaining an extract and a catalyst residue; separating the sodium hydroxide and the said extract from the catalyst residue; subjecting the catalyst residue from the said extraction to a second extraction, the said second extraction being a two-stage extraction performed first at a temperature in the neighborhood of 200° F. with sodium hydroxide having a concentration of at least 40 percent and then with a sodium hydroxide solution having a strength within the approximate range of 2 percent to 7 percent; separating the extract from the solid residue of the last mentioned extraction and washing it with water and so obtaining a crystalline synthetic sodalite having the chemical formula $$3Na_2O \cdot 3Al_2O_3 \cdot 6SiO_2 \cdot 2NaOH.$$

5. In the manufacture of synthetic sodalite from a calcined composite of undried hydrous silica and alumina gels, the process which comprises: extracting an amorphous calcined composite of undried hydrous silica and alumina gels with a weak solution of sodium hydroxide and thereby obtaining an extract and a catalyst residue; separating the sodium hydroxide and the said extract from the catalyst residue; subjecting the said catalyst residue from the said extraction to a second extraction, the said second extraction being a two-stage extraction performed first with a substantially saturated solution of sodium hydroxide and then with a weak solution of sodium hydroxide; separating sodium hydroxide and the second extract from the solid residue of the last mentioned extraction and washing this residue free of any adhering extract and so obtaining a crystalline synthetic sodalite.

6. The process of manufacturing a synthetic sodalite which comprises: extracting a calcined composite of undried hydrous silica and alumina gels with sodium hydroxide solution having a concentration of NaOH within the range of 2 percent to 7 percent and thereby obtaining an extract and a catalyst residue; separating the said extract from the catalyst residue; subjecting the catalyst residue from the said extraction to a second extraction, the said second extraction being continued for approximately five minutes at a temperature in the neighborhood of 200° F. with sodium hydroxide having a concentration of at least 40 percent and then continued further for an interval of approximately two to ten minutes with sodium hydroxide solution having a strength within the approximate range of 2 percent to 7 percent, and thereby obtaining a second extract and a twice extracted catalyst residue; separating the extract of the second extraction from the twice extracted catalyst residue; washing the twice extracted catalyst residue with water and so obtaining a crystalline synthetic sodalite.

References Cited in the file of this patent

UNITED STATES PATENTS 1,757,373     Kriegsheim 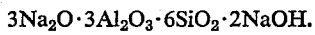 May 6, 1930